June 21, 1960 W. J. SCRIVEN ET AL 2,941,230
WINDSHIELD CLEANER
Filed April 23, 1956
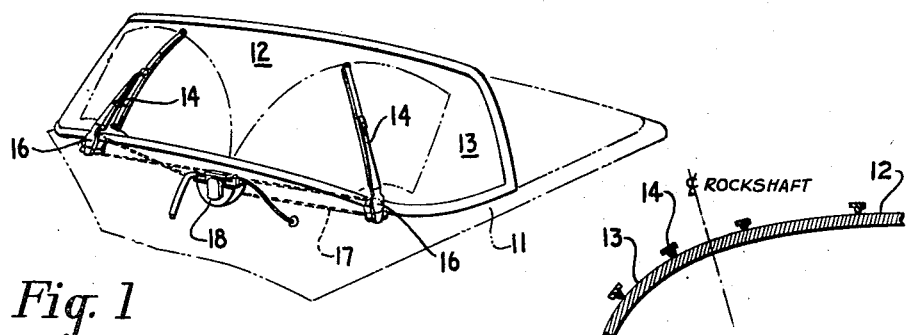
*Fig. 1*
*Fig. 2*
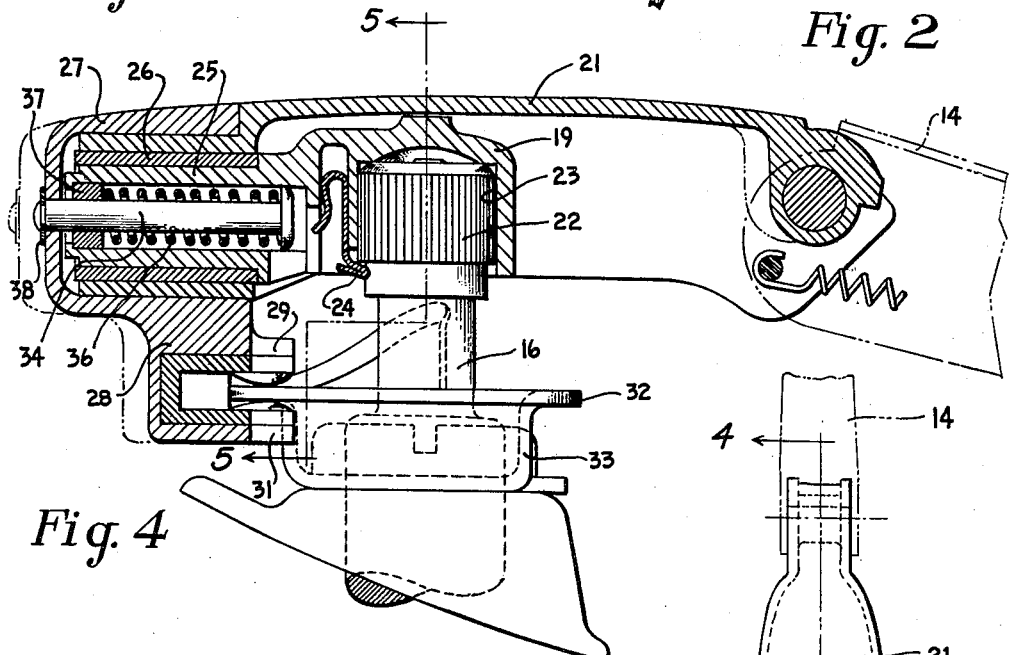
*Fig. 4*
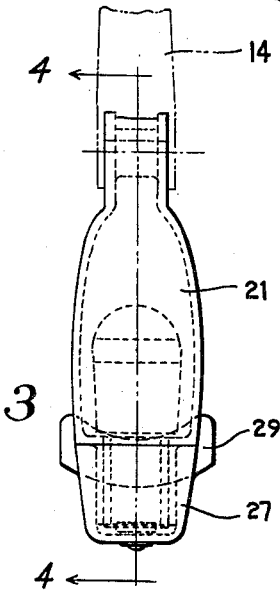
*Fig. 3*
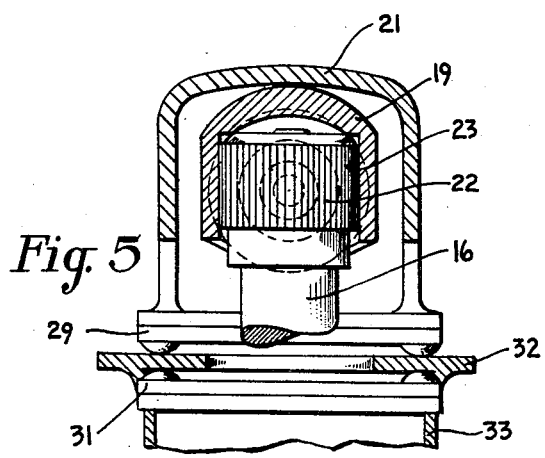
*Fig. 5*
INVENTOR.
William J. Scriven and
Sheldon J. Howard
BY Bean Brooks Buckley + Bean
ATTORNEYS

United States Patent Office 2,941,230
Patented June 21, 1960

2,941,230

WINDSHIELD CLEANER

William J. Scriven, Williamsville, and Sheldon J. Howard, Buffalo, N.Y., assignors to Trico Products Corporation, Buffalo, N.Y.

Filed Apr. 23, 1956, Ser. No. 580,020

5 Claims. (Cl. 15—250.21)

This invention relates to the windshield cleaning art and more particularly to windshield cleaners for curved windshields.

The motor vehicles of current design generally utilize a windshield of a wraparound or panoramic type, wherein the side portions of the windshield are curved to afford increased field of vision to the driver and front seat passengers. Such type of windshield has imposed problems in the design of wiper mechanisms which will wipe not only the frontal areas, but also the side portions of the windshield, the latter of which must be wiped if full advantage is to be realized from the panoramic type windshield.

In the patent of J. R. Oishei et al., 2,691,186, a windshield cleaner is disclosed having a cam means arranged to control the attitude of the windshield wiper as it oscillates upon the frontal area of the windshield and an adjoining side area thereof. In a copending application Serial No. 464,967, now Patent No. 2,781,540, an improved normalizing mechanism has been disclosed which betters the structure from a commercial viewpoint and to facilitate the installation of the arm on its shaft.

The present invention has for its primary object to provide an improved normalizing wiper arm which is more readily mounted on and demounted from its actuating shaft and represents an improvement over the earlier constructions in the manner of arranging the cam mechanism for controlling the action of the wiper. More particularly, the cam means of the present invention is arranged on the side of the rockshaft opposite to that from which the main body of the wiper arm extends. Among the advantages of the cam arrangement of the present invention is that the bulk of the cam mechanism is placed below the lower edge of the windshield frame thus being out of the vehicle operator's line of sight. In addition, such positioning of the wiper cam mechanism provides a better distribution of the frictional load imposed upon the rockshaft, since the friction of the cam mechanism acts in opposition to the friction encountered by the wiper blade as it oscillates upon the windshield. Such improved distribution of frictional load minimizes the bearing thrust thus providing smoother action during wiper operation and results in more uniform wear characteristic leading to prolonged life of the wiper mechanism. A further advantage afforded by the present invention results from a more simplified and faster assembly, or mounting operation as will be described more fully hereinafter.

Again, the object of this invention is to provide a windshield cleaner for use on panoramic type windshields, which cleaner includes a cam mechanism arranged to be out of the vehicle driver's line of sight.

Another object of this invention is to provide a windshield cleaner for use on panoramic type windshields, which cleaner has a cam mechanism arranged to provide a better distribution of frictional load upon the wiper arm rockshaft.

A further object of this invention is to provide a windshield cleaner for use on panoramic type windshields, which cleaner incorporates a cam means for regulating the action of the wiper in a manner contributing to smoother operation, more uniform wear, and prolonged service life.

These and further objects and features of the invention will become more apparent from the following description and the accompanying drawings wherein;

Fig. 1 is a fragmentary perspective view of a motor vehicle having a windshield cleaner embodying the principles of the present invention;

Fig. 2 is a fragmentary schematic view illustrating the normal relationship of the wiper blade upon the surface of the windshield during wiper operation;

Fig. 3 is a partial plan view of a wiper arm embodying the principles of the invention;

Fig. 4 is an enlarged view as seen from line 4—4 in Fig. 3; and

Fig. 5 is a section view as seen from line 5—5 in Fig. 4.

Referring to Fig. 1, numeral 11 identifies a motor vehicle having a windshield 12 of the wraparound, or panoramic type including lateral areas 13 which are arranged to afford side vision. A pair of wiper arms 14, are mounted upon rockshafts 16 for oscillatory movement upon the windshield, the rockshafts being connected by a flexible transmission means such as cables 17 to a wiper motor 18.

The wiper arms are arranged for the wiping of the relatively flat frontal area of the windshield, as well as a portion of the lateral areas. To provide effective wiping action, the wiper blade must be maintained substantially normal to the surface of the windshield being wiped, as is illustrated schematically in Fig. 2. To meet such condition, a cam means is arranged for the positional control of the wiper blades as they oscillate upon the windshield.

Referring more particularly to Figs. 3, 4 and 5, the cam mechanism includes a shaft mounted section 19 and an arm mounting section 21, the latter of which pivotally supports the wiper arm 14. Rockshaft 16 has an enlarged head on which are formed longitudinally extending serrations 22 arranged for engagement with coacting serrations formed in a socket 23 of the shaft mounted section 19. A resilient clip member 24 is arranged to maintain the shaft mounted section 19 upon the end of the rockshaft, as best seen in Fig. 4. The shaft mounted section 19 has a cylindrical portion 25 formed integral therewith and projecting radially with respect to the rockshaft and having a center-line arranged parallel with the longitudinal center-line of the arm mounting section 21 and wiper arm 14. Arranged upon the cylindrical portion 25 is a bushing 26 adapted for the rotational support of one end of the arm mounting section 21. It is to be noted that the arm mounting section 21 is supported at its medial portion upon the top of the shaft mounted section 19, said support allowing rocking movement thereupon. It is to be further noted that the sides of the arm mounting section 21 form a sheathing to encase the shaft mounted section 19. A cam follower piece 27 is affixed to the end of the arm mounting section 21, whereby rotation of the cam follower piece will cause rotation of the arm mounting section upon the bushing 26.

The cam follower piece 27 has an arm portion 28 on which are formed a pair of spaced opposed fingers 29, 31, adapted to slidably engage opposite sides of a flange 32 formed on a cam plate 33 which is centered upon the rockshaft 16. The flange 32 is curved to produce a rotary action upon the cam follower piece 27 as the arm mounting section 21 is reciprocated by the rockshaft, to thus provide a normal attitude of the attached wiper blades with respect to the windshield as the wiper blades are moved upon the windshield, as is illustrated in Fig. 2.

The arm mounting section 21 is maintained upon the end of the shaft mounted section 19 by means of a pin 34, arranged in the cylindrical portion 25, which pin has a spring 36 compressively arranged between the head thereof and a bushing 37 affixed within the cylindrical portion 25. On the outer end of the pin 34 is a washer 38 which engages the outer surface of the cam follower piece 27. It will be seen that by pushing the arm mounting section 21 is a direction toward the cam follower piece, the fingers 29, 31 will be disengaged from the flange 32 of the cam plate 33 so that the arm mounting section 21 can be removed from the rockshaft. To mount the section 21 upon the rockshaft, it is only necessary to push the arm mounting section 21 in a direction toward the cam follower piece, position the shaft mounted section 19 upon the rockshaft, and urge it downwardly upon the rockshaft until the fingers 29, 31 are in alignment with the flange 32, whereupon the spring loaded pin 34 will pull the cam follower piece 27 in the direction of the wiper arm 14.

The advantage of the instant invention over earlier designs wherein the cam was arranged on the same side of the rockshaft as the wiper arm, is that in mounting the section 21 upon the end of the rockshaft, the effort used to apply an outward thrust in the direction of the cam follower piece may be supplemented by pushing effort downwardly upon the rockshaft, such action requiring the use of but one hand. In the assembly of the prior art cam arrangements, the outward pull on the wiper arm required the use of the other hand to apply a downward pressure to position the arm mounting section on the end of the rockshaft. The ease of installation afforded by the arrangement of the present invention contributes to a more simplified and faster assembly operation.

It may be mentioned that the contour of the flange 32 of the cam plate 33, arranged on the driver's side of the vehicle, will be exactly opposite to that of the cam plate on the rockshaft on the passenger side of the vehicle, because of the fact that the curve of the lateral areas on each side of the windshield are directly opposite.

From the foregoing it will be seen that the windshield cleaner of the invention provides a means whereby attached wiper blades may be maintained normal to the surface when they are oscillating upon a panoramic type windshield, and further that the cam mechanism is arranged below the lower edge of the windshield and out of the line of sight of the vehicle driver and passengers. It will be further seen that the windshield cleaner of the invention provides a better distribution of the frictional load imposed upon the rockshaft, because of the fact that the friction of the cam mechanism i.e., the fingers 29, 31 sliding upon the flange 32, acts in opposition to friction encountered by the wiper blade as it moves upon the windshield, said improved frictional distribution contributing to smoother operation, more uniform wear, and prolonged service life. In addition, the ease with which the wiper arm may be mounted upon the rockshaft leads to faster installation, represents an advantage over the arrangements of the prior art.

The foregoing description has been given in detail, without thought of limitation since the inventive principles involved are capable of assuming other physical embodiments without departing from the spirit of the invention and the scope of the appended claims.

What is claimed is:

1. A cleaner for vehicle windshields of the panoramic type comprising a rockshaft, a wiper arm including an arm mounting section affixed to the end of said rockshaft and a blade carrying section extending therefrom, and means including a cam means arranged for maintaining an attached blade normal to the surface of an associated windshield as the wiper arm oscillates thereacross, said cam means being mounted about the side of said rockshaft diametrically opposite to said wiper arm blade carrying section and having a follower piece including cam engaging fingers adapted for sliding contact with a flange portion of a cam plate positioned on said rockshaft.

2. In a cleaner for vehicle windshields of the panoramic type having a rockshaft and a wiper arm supported on said rockshaft for oscillatory movement upon an associated windshield, cam means including a follower piece adapted to rotate said wiper arm about an axis normal to the axis of said rockshaft as said rockshaft is oscillated, said follower piece being arranged relative to said rockshaft diametrically opposite to the blade carrying portion of said wiper arm and having cam engaging fingers adapted for sliding contact with a flange portion of a cam plate positioned about said rockshaft, said flange portion being curved to provide said rotational movement of said wiper arm to maintain an attached blade normal to the windshield in all operative positions.

3. In a cleaner for vehicle windshields of the panoramic type having a rockshaft arranged to be oscillated by a wiper motor, a blade supporting wiper arm pivotally affixed to an arm mounting section for angular movement in a plane including the axis of said rockshaft, a shaft mounted section affixed to the end of said rockshaft and supporting said arm mounting section for rotary movement about a second axis normal to the axis of said rockshaft, said arm mounting section being movable along said second axis relative to said shaft mounted section, a cam follower piece affixed to said arm mounting section, a pair of oppositely spaced fingers formed integral with said cam follower piece, a cam plate having a flange engageable by said fingers, said flange being curved in a manner to provide rotary motion of said cam follower piece as said fingers slide on said flange during rockshaft oscillation whereby an attached wiper blade is maintained normal to the windshield in all operative positions of said wiper arm, and resilient means arranged to urge said cam follower piece in the direction of said wiper arm.

4. A wiper normalizing arm assembly comprising, a mounting section having a shaft engaging part and a radially extending bearing support, an arm carrying section journaled at one end of said bearing support for lateral rocking and axial sliding relative thereto and having a part overlying said shaft engaging part in slidable supporting contact therewith and extending therebeyond to support an arm, and follower means having a cam engaging portion carried by said arm carrying section on the opposite side of such slidable supporting contact from a supported arm and cooperable with a fixed pattern cam to rock said arm carrying section in a wiper normalizing manner.

5. A wiper assembly as set forth in claim 4, wherein said arm carrying section part has an open bottom for nesting over said shaft engaging part to afford guiding support for said arm carrying section when engaging and disengaging said cam engaging portion from such a cam.

References Cited in the file of this patent

UNITED STATES PATENTS

| | | |
|---|---|---|
| 2,691,186 | Oishei et al. | Oct. 12, 1954 |
| 2,781,540 | Deibel | Feb. 19, 1957 |